US008087592B2

(12) United States Patent
Silva

(10) Patent No.: US 8,087,592 B2
(45) Date of Patent: Jan. 3, 2012

(54) PRESSURE-THERMOSTAT

(75) Inventor: Giorgio Silva, Mariano Comense (IT)

(73) Assignee: Euroswitch S.R.L., Sale Marasino (IT)

( * ) Notice: Subject to any disclaimer, the term of this patent is extended or adjusted under 35 U.S.C. 154(b) by 545 days.

(21) Appl. No.: 12/403,878

(22) Filed: Mar. 13, 2009

(65) Prior Publication Data

US 2009/0236550 A1 Sep. 24, 2009

(30) Foreign Application Priority Data

Mar. 19, 2008 (EP) .................................... 08425180

(51) Int. Cl.
*H01H 37/02* (2006.01)
*G05D 23/02* (2006.01)

(52) U.S. Cl. ....................... 236/87; 236/101 E; 337/300

(58) Field of Classification Search .................... 236/85, 236/87, 101 R, 101 E; 200/83 P; 337/3, 337/13, 300, 333; 251/73
See application file for complete search history.

(56) References Cited

U.S. PATENT DOCUMENTS 3,105,888 A 10/1963 Gerdes
4,458,117 A 7/1984 Johnson
4,757,165 A 7/1988 Marcoux et al.
5,121,094 A 6/1992 Ting et al.
5,889,247 A * 3/1999 Homol ......................... 200/83 P
6,737,952 B2 * 5/2004 Morin et al. .................. 337/300

FOREIGN PATENT DOCUMENTS

EP 0272934 A2 6/1988
EP 1790964 A1 5/2007

* cited by examiner

*Primary Examiner* — Marc Norman
(74) *Attorney, Agent, or Firm* — Pearne & Gordon LLP

(57) ABSTRACT

A pressure-thermostat (1) includes a body (2) having a cavity (5), a conduit (6) for a fluid and at least a couple of electric switches (8*a*, 8*b*) arranged from the opposite part with respect to said conduit (6). An elastic membrane (9) separates, in a fluid-tight manner, the conduit (6) relative to the cavity (5) and is deformable for bending towards this latter. The pressure-thermostat (1) includes a thermostat (12) having a first electric switch (13) activable owing to a thermal deformation of a disk with a diameter higher or equal to 15 mm, arranged in correspondence with the bottom. The thermostat (12) is movable under the action of the elastic membrane (9) away or approaching with respect to the conduit (6). The pressure-thermostat (1) also includes transmission means (34) interposed between the elastic membrane (9) and the thermostat (12) for displacing this latter under the action of the elastic membrane (9). Transmission means (34) exchange heat with the elastic membrane (9) and the thermostat (12) and have a minimum cross section higher than 8 $mm^2$.

20 Claims, 6 Drawing Sheets

PRESSURE-THERMOSTAT

The present invention relates to a pressure-thermostat.

In particular, the present invention relates to a pressure-thermostat for a use in fluidodynamic circuits of devices of different kinds, such as operating machines, vehicles, vehicles with mechanical arms, etc.

As it is known, pressure-thermostats are devices which control if two conditions, relating to pressure and temperature, respectively, have been respected, typically in a fluid. In the present description and claims, the term "pressure-thermostat" means a device suitable for detecting, typically in a substantial concomitance, both the temperature state and the pressure state in a fluid with reference to at least a respective predetermined value (for example if it is above or below the respective predetermined threshold). Typically, each single detected quantity (pressure and temperature) can adopt two states, above and below the predetermined threshold, for a total of four possible states of the combination of the two quantities. The pressure-thermostat is suitable for differentiating at least one of such four states from the remaining three. Typically the pressure-thermostat differentiates only one of the four states, but the present invention finds an advantageous application also to pressure-thermostats which differentiate two states out of four, for example as they are suitable for distinguishing the state of each single quantity separately detected from the other quantity.

An example of a known pressure-thermostat includes a body within which a housing cavity and a conduit in a fluid communication with a fluid source of a corresponding fluidodynamic circuit are defined. The housing cavity is separated from the conduit by an elastic membrane which elastically deforms depending on the pressure detectable within the fluid existing in the conduit.

In particular, when the pressure exceeds a predetermined threshold value, the elastic membrane starts to deform extending itself towards the housing chamber.

Generally, the elastic membrane is into a direct contact with a small piston made of a metallic material, which is in turn directly contacting with a metal bottom of a thermostat sliding within the housing cavity. In this way, when the elastic membrane is deformed, it moves the small piston which in turn presses the thermostat away from the conduit and approaching to corresponding wires placed within the body opposite with respect to the conduit itself.

The thermostat supports a first electric switch activable following to temperature variations in correspondence with the metallic bottom of the thermostat. The first electric switch consists of two additional fixed conductors and a movable one, whereby when the metallic bottom of the thermostat reaches or exceeds a predetermined threshold temperature, a thermally deformable element (typically a bimetallic disk with a diameter lower or equal to 13 mm) determines the displacement of the movable conductor which closes the corresponding electric switch.

Each fixed conductor of the first electric switch carried by the thermostat shows a conductive foil which is suitable for engaging the corresponding conductor carried by the body when the thermostat is moved by the small piston and the membrane due to the pressure within the fluid. In this way, a second electric switch, in series with the first electric switch, closes itself allowing the passage of current along a corresponding electric circuit.

In the absence of the closing of at least one of the two electric switches, namely in the absence of the attainment or exceeding of at least one of the pressure or temperature values above mentioned, the corresponding circuit remains open without any current passage.

Although pressure-thermostats as the one above described allow to detect the state of two significant parameters of a fluid, such as pressure and temperature, the Applicant has found that, however, they are not free from some drawbacks and can be ameliorated under different aspects, mainly with reference to the activation of the first switch when the fluid has reached and exceeded the corresponding threshold value of the temperature.

In particular, the Applicant has realized that thermostats in the pressure-thermostats of the known art are inefficient, in terms of response rapidity and/or sensitivity, in the detection of the attainment of the predetermined threshold temperature in correspondence with the elastic membrane. The Applicant has found, in the known thermostats, a delay in the closing or opening of the first electric switch with respect to the attainment and exceeding of the predetermined threshold temperature in correspondence with the elastic membrane. The Applicant has also noted a poor sensitivity in the detection of the threshold attainment in case of small temperature variations. The Applicant considers that the finding of such problem is per se a novelty. The Applicant considers that such inefficiency of the known thermostats can be due to different factors.

First of all, in the known pressure-thermostats, the thermal bridge between the elastic membrane and the thermally deformable element of the thermostat does not allow an efficient heat exchange between the fluid and the thermostat itself, for example due to the restricted sections of the small piston of the known art and/or the restricted contact surfaces of the small piston with the elastic membrane and the bottom of the thermostat. The small piston of the known art has a section diameter which does not exceed 3 mm for a large part of its longitudinal development, including the contact surface with the bottom of the thermostat.

The Applicant also considers that a disadvantage of the known art is that the small piston is a separated element from the bottom of the thermostat, thus a separation surface between the two elements is brought about, which does not encourage the mutual heat exchange.

Moreover, the Applicant considers that within the known pressure-thermostats the surface of the bimetallic disk, as well as the section of the seat of the bottom of the thermostat containing the same, is not sufficiently wide for imparting the due sensitivity of the thermostat to the small temperature variations.

It is an object of the present invention to propose a pressure-thermostat capable of solving the problems found in the known art.

A further object of the present invention is to propose a pressure-thermostat which is capable of rapidly and/or highly sensitively responding to the temperature variations of the corresponding fluid.

These and other aims, which will better result during the following description, are substantially attained by a pressure-thermostat including the features expressed in the following claims.

In one aspect, the invention relates to a pressure-thermostat according to the appended claim 1, the dependent claims being referred to preferred embodiments of this aspect of the invention.

In another aspect, the invention relates to a pressure-thermostat including a body having a housing cavity and a conduit suitable for containing a fluid; an elastic membrane placed for separating, in a fluid-tight manner, said conduit from said housing cavity, said elastic membrane being elastically deformable between a resting condition and a working condition, wherein at least a portion thereof is protruding towards said housing cavity; a thermostat including a bottom and a thermally deformable element housed in proximity of said bottom, said thermostat being movable within said housing cavity between a first position and a second position; and transmission means interposed between said elastic membrane and said thermostat for transmitting the movement from the elastic membrane to the thermostat and vice versa, such that the first and the second positions of the thermostat correspond with the resting condition and the working condition, respectively, of said elastic membrane, said transmission means being suitable for carrying out a thermal bridge between said elastic membrane and said thermostat, wherein said thermally deformable element has a diameter higher or equal to 15 mm.

In a further aspect, the invention relates to a pressure-thermostat including a body having a housing cavity and a conduit suitable for containing a fluid; an elastic membrane placed for separating, in a fluid-tight manner, said conduit from said housing cavity, said elastic membrane being elastically deformable between a resting condition and a working condition, wherein at least a portion thereof is protruding towards said housing cavity; a thermostat including a bottom, said thermostat being movable within said housing cavity between a first position and a second position; and transmission means interposed between said elastic membrane and said thermostat for transmitting the movement from the elastic membrane to the thermostat and vice versa, such that the first and the second positions of the thermostat correspond with the resting condition and the working condition, respectively, of said elastic membrane, said transmission means being suitable for carrying out a thermal bridge between said elastic membrane and said thermostat, wherein said transmission means are a single piece with said bottom of said thermostat. Such solution can have a minimum cross section higher, equal or even lower than 8 $mm^2$.

In all the aspects above mentioned, typically (but not necessarily) the typically circular section of the housing cavity has a diameter lower than, or equal to, about 22 mm.

Further features and advantages will better result from the detailed description of a preferred but not exclusive embodiment of a pressure-thermostat according to the present invention.

Such description will be set forth below with reference to the enclosed figures, which are given by a mere indicative and therefore not limiting purpose, wherein.

Figure 1:
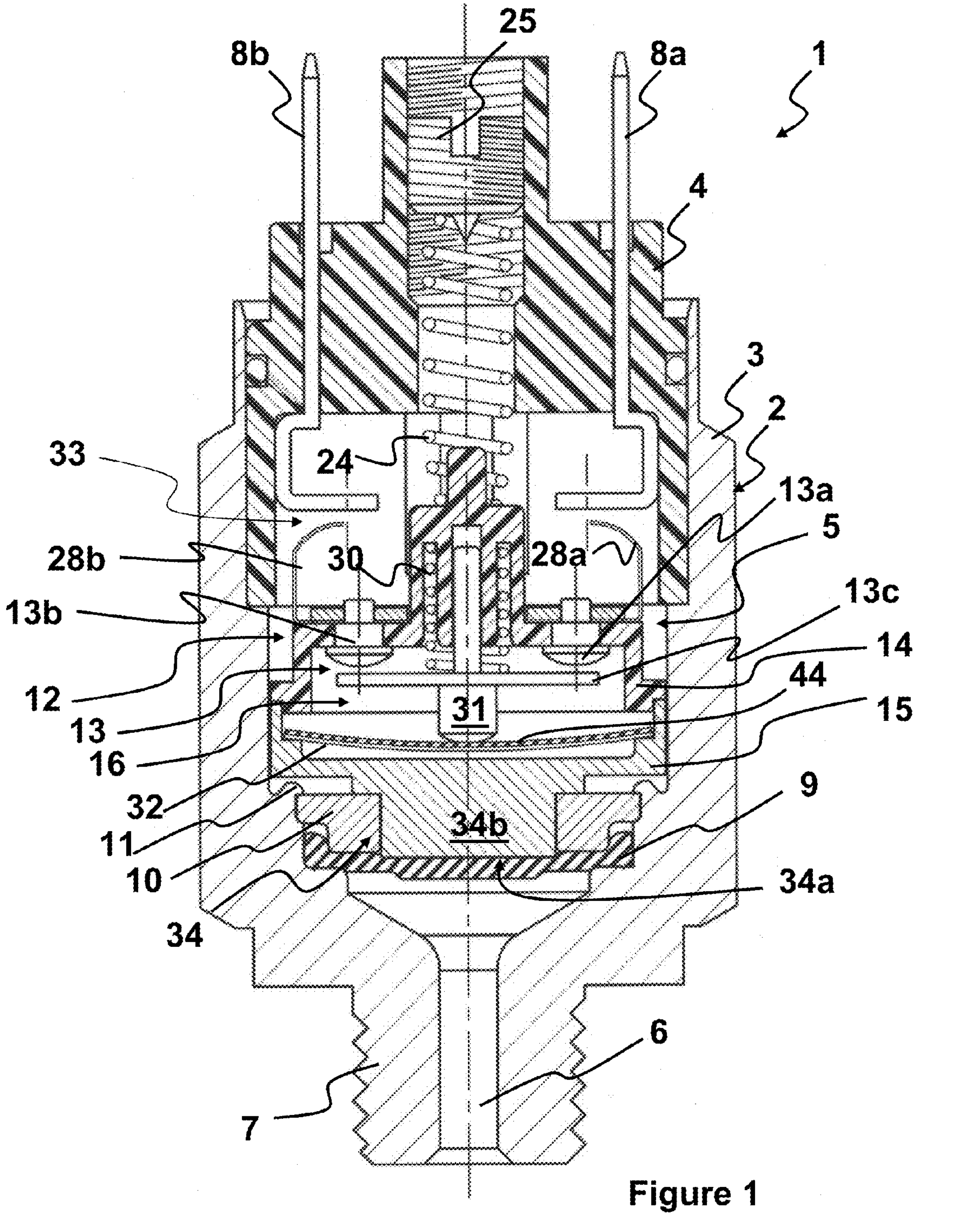
FIG. 1 is a sectional representation of a pressure-thermostat according to a first embodiment solution of the present invention.

With reference to FIGS. 1, 2, 6 and 7, by 1 a pressure-thermostat is generally shown, according to the present invention.

As it is visible in the figures, the pressure-thermostat 1 includes a substantially cylindrical body 2 consisting of a first and a second portions 3, 4 mutually coupled (for example partially and axially inserted one within the other) so as to define at least a housing cavity 5.

The first portion 3 has a conduit 6 suitable for being placed into a fluid communication with a source of a pressure fluid. In particular, the conduit 6 can be connected with a fluidodynamic circuit (not shown) by means of a threaded connection fitting 7. The fluid is typically a liquid, such as oil or the like.

Opposite with respect to the conduit 6, the second portion 4 has a couple of electric conductors 8*a*, 8*b*. In use, a tension is applied to the couple of electric conductors 8*a*, 8*b*.

Advantageously, the pressure-thermostat 1 includes at least a substantially circular elastic membrane 9, operably associated with the conduit 6 for isolating, in a fluid-tight manner, this latter relative to the housing cavity 5. The elastic membrane 9 is housed in a proper circular seat obtained within the first portion 3. The membrane 9 is elastically deformable between a resting condition, wherein it lays on a plane substantially transversal to the longitudinal development of the conduit 6, and a working condition (not shown), wherein at least a portion thereof (typically the central portion) is bent and protruded in the longitudinal development direction of the conduit 6, towards the housing cavity 5.

Figure 2:
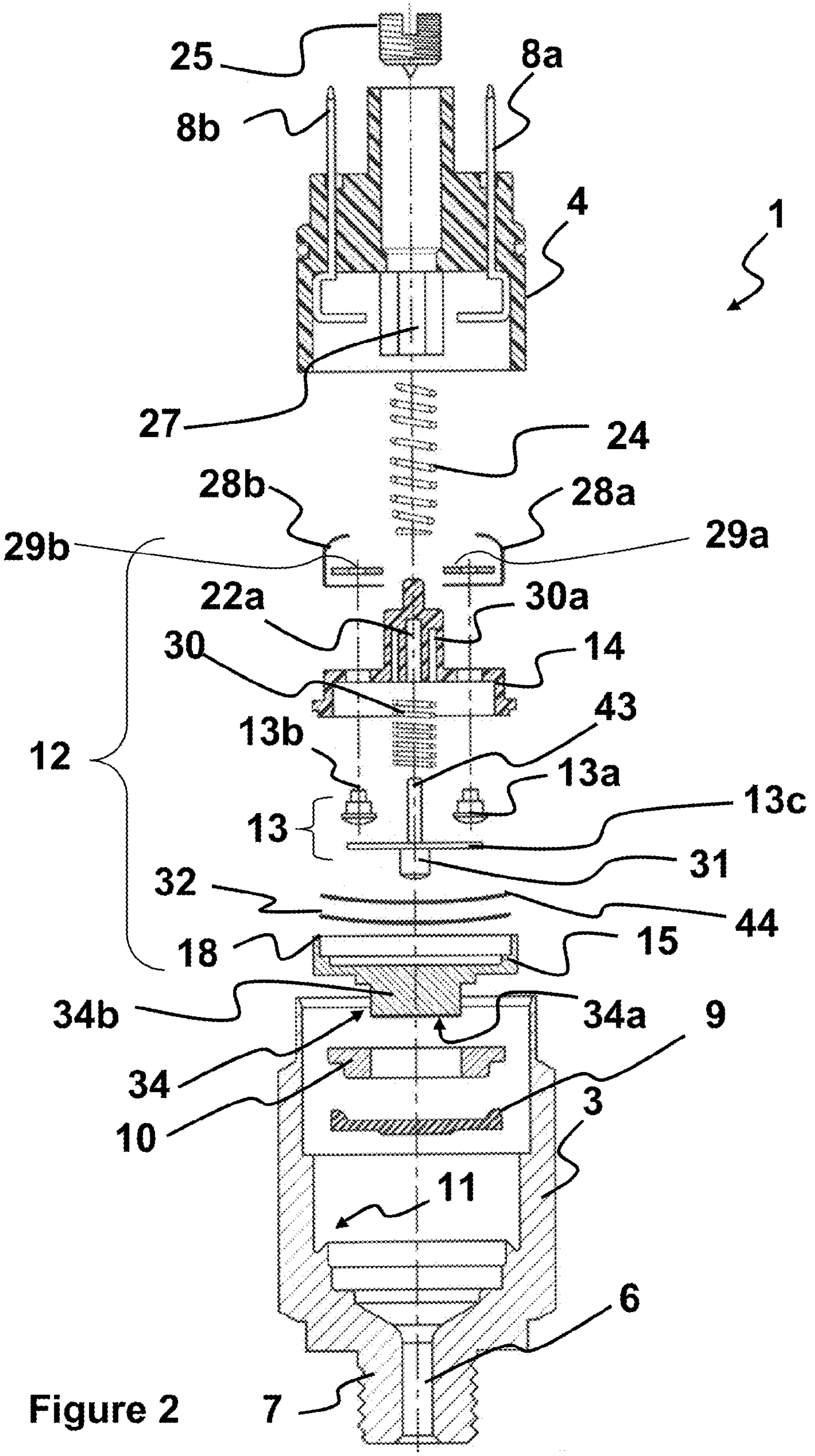
FIG. 2 is a sectional and exploded representation of the pressure-thermostat of the preceding figure.

As shown in FIGS. 1 and 2, the elastic membrane 9 is kept in position within the proper seat by a contrast ring 10 which is blocked on the elastic membrane 9 through riveting of an internal annular relief 11 of the first portion 3 of the body 2. For clearness, it is stated that FIG. 2 shows such annular relief in its conformation before the riveting, while FIG. 1 in its conformation after the riveting.

The pressure-thermostat 1 includes a thermostat 12 having a first electric switch 13 activable following to a thermal variation.

The thermostat 12 is operably arranged within the housing cavity 5 within which it is movable due to the action of the elastic membrane 9 between a first position, in which it is near to the conduit 6 and spaced by the electric conductors 8*a*, 8*b*, and a second position, in which it is more spaced from the conduit 6 and closer to the electric conductors 8*a*, 8*b*. More particularly, when the elastic membrane 9 is in its respective first position, the thermostat 12 is arranged in its respective first position, vice versa when the elastic membrane 9 moves in the second position, it presses the thermostat 12 in its respective second position towards the electric conductors 8*a*, 8*b*. Accordingly, the thermostat 12 slides within the housing cavity 5 approaching to the electric conductors 8*a*, 8*b* due to the fluid pressure in the conduit 6.

The thermostat 12 includes a support element 14 and a bottom 15 arranged from opposite parts to define a central space 16 in which the first switch 13 is located.

Figure 3:
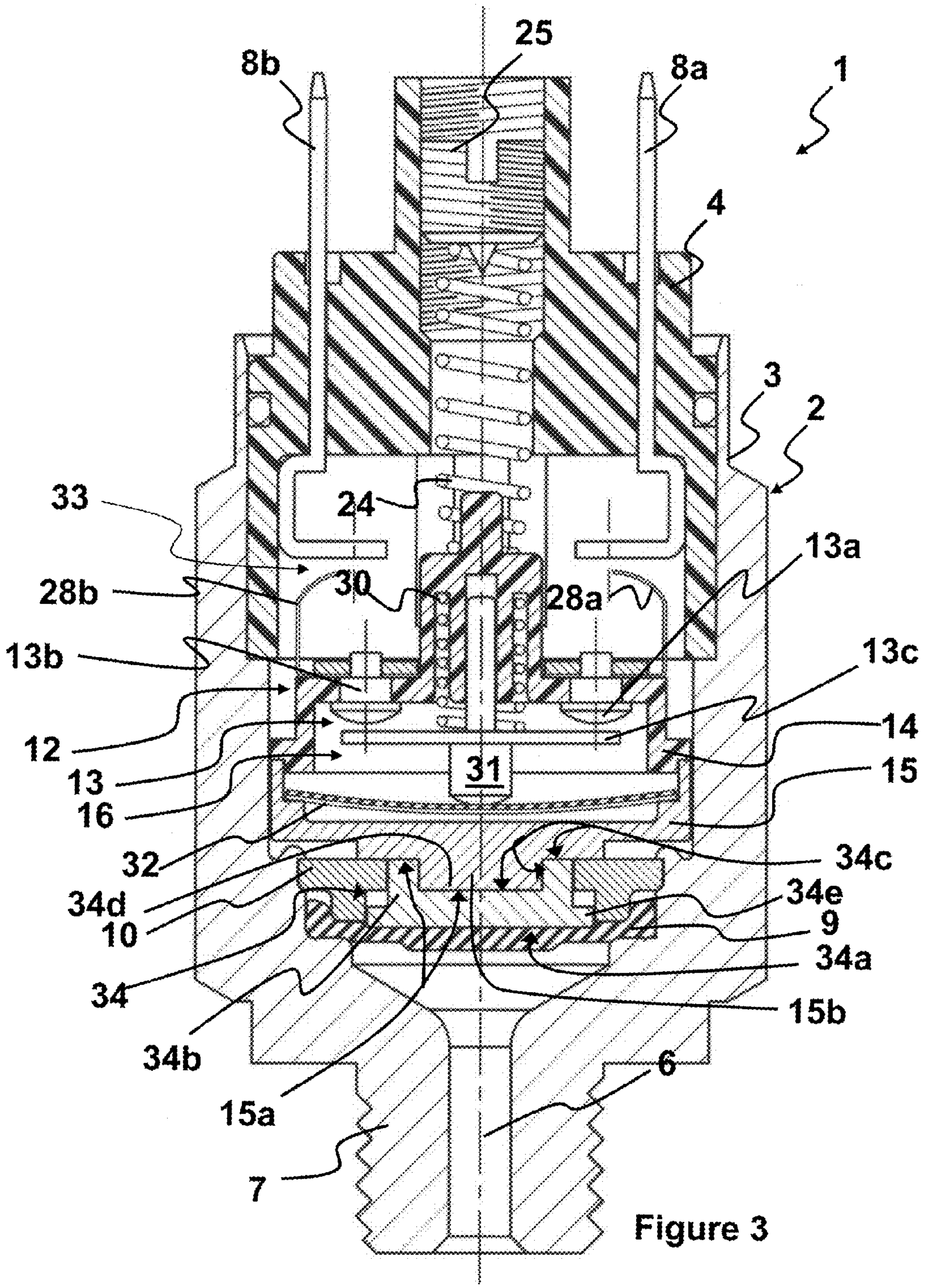
FIG. 3 is a sectional representation of a pressure-thermostat according to a second embodiment solution of the present invention.
Figure 6:
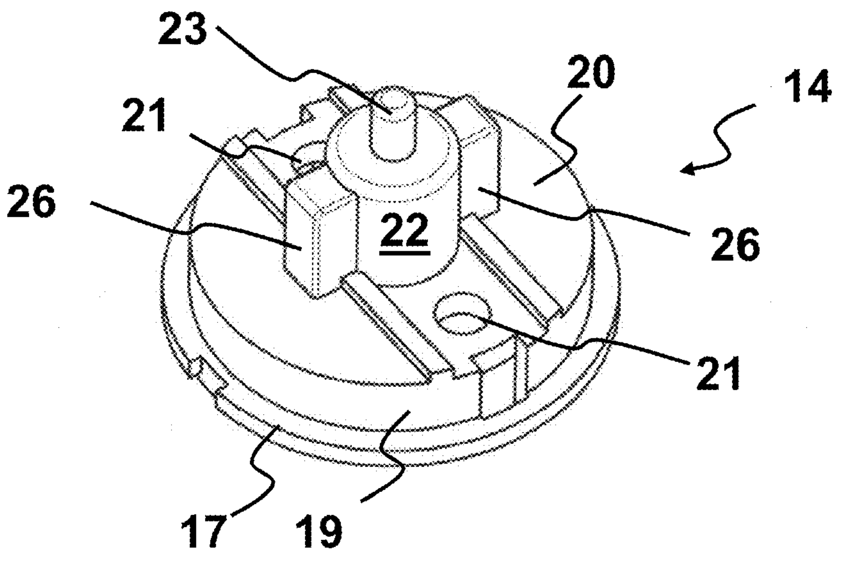
FIG. 6 is a perspective view of a first component of the pressure-thermostat of the preceding figures.

As it is visible in FIGS. 1 and 3, and particularly in FIG. 6, the support element 14 of the thermostat 12 shows a bearing perimetrical edge 17 engaged on a corresponding supporting end edge 18 of the bottom 15. From the bearing perimetrical edge 17 a cylindrical wall 19 is extending, which ends with a support transverse plane 20. The support transverse plane 20 has two through-openings 21, through which the corresponding fixed conductors 13*a*, 13*b* of the first electric switch 13 are fixed. The through-openings are carried out along a same diametral plane of the support element 14, each one between the center and the perimeter of the transverse support plane 20.

Referring again to FIGS. 1, 2 and 6, from the transverse support plane 20 a cylindrical portion 22 is centrally extending, which ends with a central small cylinder 23. The cylindrical portion 22 and the central small cylinder 23 support a first coil spring 24 which, from the opposite part, ends arresting against a calibration pin 25 for the adjustment of the threshold value of the pressure. The coil spring 24 keeps the thermostat 12 pushing against the membrane 9. By directly acting against the calibration pin 25, for example through screwing within the own threaded seat, it is possible to increase or decrease the load on the elastic membrane 9 thus increasing and decreasing, in consequence, the deformability of the same with an equal pressure. In this way, through the calibration pin 25 the maximum pressure value is adjusted, beyond which the elastic membrane 9 is deformed and presses the thermostat 12 from the first to the second position.

With reference to FIG. 6, the support element 14 is at least equipped with a guide element 26, preferably two, sliding along corresponding guide seats 27 obtained within the second portion 4 of the body 2. Advantageously, the guide elements 26 present a substantially squared conformation and are located on a same diametral plane of the support element 14 from the opposite part. In particular, guide elements 26 are located on a diametral plane substantially perpendicular to the diametral plane along which the openings 21 are obtained.

Figure 7:
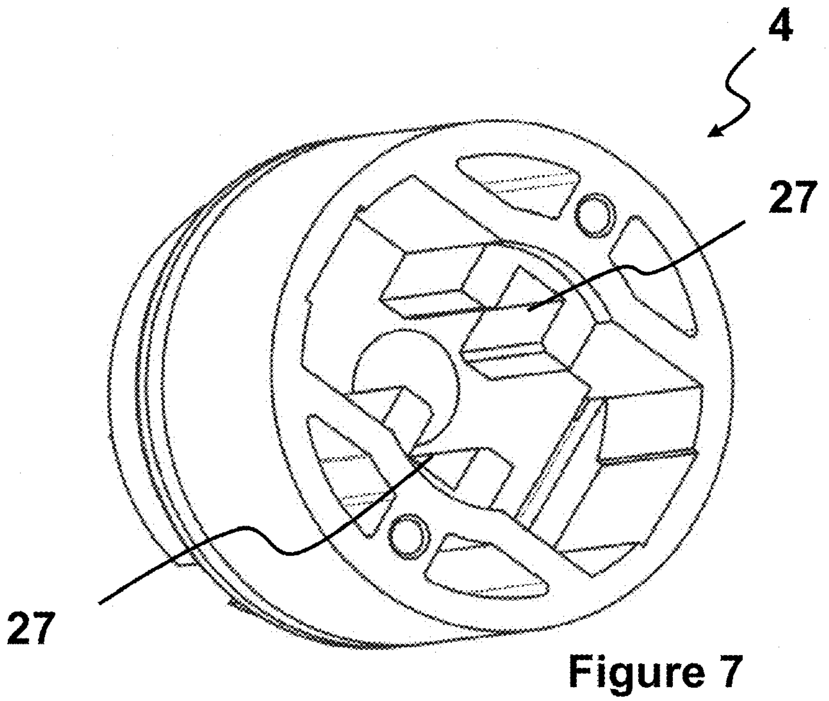
FIG. 7 is a perspective view of a second component of the pressure-thermostat of the preceding figures.

With reference to FIG. 7, the guide seats 27 are at least partly countershaped to the guide elements 26, whereby the guide seats 27 result substantially squared and are preferably located on a same diametral plane of the body 2.

The fixed conductors 13*a*, 13*b* of the first electric switch 13 are electrically connectable by means of a movable conductor 13*c* operably arranged within the central space 16 of the thermostat 12. In detail, the movable conductor 13*c* consists of an electrically conductive contact foil, typically in form of a disk, extending between said fixed conductors 13*a*, 13*b* along the transverse development of the cavity 5. Orthogonal to the movable foil 13*c* and integral therewith, a pusher is extending, including a sliding pin 43 which slidably engages a sliding seat 22*a* obtained within the cylindrical portion 22 along the longitudinal development of the cavity 5. Coaxially to the sliding pin 43 of the pusher, a second coil spring 30 is operably arranged, which occupies at least partly a corresponding seat 30*a* also obtained within the cylindrical portion 22 of the support element 14 of the thermostat 12, in a more external radial position relative to the seat 22*a*.

Opposite to the sliding pin 43, the pusher includes a cylindrical protrusion 31 which is maintained under thrust due to the spring 30, against a thermally deformable element 32, typically a laminar element. The laminar element 32 can be a disk arranged with its own circumferential edge abutting against respective internal edges of the bottom 15 of the thermostat 12.

Advantageously, the thermally deformable element 32 has a diameter greater or equal to 15 mm, still more advantageously greater or equal to 17 mm, in an optimal conformation greater or equal to about 19 mm (or corresponding surfaces in case of a non-circular shape). In fact, the Applicant has seen that a wide surface of the element 32 increases the sensitivity and/or the promptness of the thermostat. Advantageously, the laminar element 32 is a bimetallic and bistable disk, per se known in the art. Typically, the laminar element 32, depending on its temperature, can assume two conformations: the first conformation having a concavity towards a half-space (or alternatively no concavity) and the second conformation having concavity towards the opposite half-space (or, in case of a first hollow conformation, no concavity). The passage from the first to the second conformation takes place in concomitance with the passage from below to above a predetermined temperature and is reversible when the temperature returns from above to below said predetermined temperature.

The element 32 is preferably electrically insulated by means of an insulating disk 44 made of a plastic material, such as for example Kapton® or Mylar®, so as to allow the execution of the movable conductor 13*c* and the pusher (31, 43) in a single metal piece. Alternatively to the insulating disk 44, it is possible to provide the protrusion 31 with an insulating coating, or carrying out the protrusion 31 completely in an insulating material.

With reference to FIG. 1, it is assumed that the laminar element 32 is arranged such that at a temperature below the predetermined threshold value, it lays in a first hollow conformation with a concavity towards the first electric switch 13 (shown in FIG. 1). When the laminar element 32 is in such condition, the first electric switch 13 is in an open condition, namely with the movable conductor 13*c* lowered. When the laminar element 32 is heated above the predetermined threshold value, it takes a second hollow (or plane) conformation from the opposite part (not shown). Such form change determines the raising of the cylindrical protrusion 31 (and the whole pusher) and accordingly of the movable conductor 13*c*, which then closes the first switch 13 by connecting the fixed contacts 13*a*, 13*b*.

To the fixed conductors 13*a*, 13*b* of the first electric switch 13 two conductive foils 28*a*, 28*b* are engaged and electrically connected, respectively, which are maintained in position through corresponding blocking elements 29*a*, 29*b*, for example two washers 29*a*, 29*b*, in which the ends of the respective fixed conductors 13*a*, 13*b*, which are preferably blocked through riveting of the ends, are introduced. The conductive foils 28*a*, 28*b* are placed at least partly on the transverse support plane 20 and are extending orthogonal from this latter in the direction of the electric conductors 8*a*, 8*b*.

The conductive foils 28*a*, 28*b* form, together with the conductors 8*a*, 8*b*, a second electric switch 33, in series with the first electric switch 13. The second electric switch 33 is operable as a consequence of pressure variations in the fluid of the conduit 6, when the pressure reaches a predetermined threshold value.

With reference to the embodiment solution represented in FIGS. 1 and 2, in use the second electric switch 33 is open when the pressure value of the fluid in the conduit 6 remains below the predetermined threshold value (through calibration of the pin 25) and is closed, due to the deformation of the elastic membrane 9 which moves the thermostat 12 from the first to the second position, when the fluid pressure reaches the threshold value above mentioned, remaining closed until the pressure remains above such value.

Being the first and second switches 13, 33 arranged in series, in use the two contacts 8*a* and 8*b* remain open (not electrically connected) in all the situations in which at least one between the temperature and the fluid pressure within the conduit 6 is below the respective threshold value, while they close themselves when both temperature and pressure are above the respective threshold.

The above is valid in the case of the foil 32 previously introduced. On this matter, it is observed that by reversing the bimetallic disk 32 (such that the conformation shown in FIG. 4 becomes, in this case, the one in correspondence with temperature values above the threshold value), the first switch 13 remains close for temperature values below the threshold value and vice versa. In this case, in use the two contacts 8*a* and 8*b* remain open in all the cases in which the temperature is above the respective threshold value or the pressure is below the respective threshold value, while the two contacts are connected only when both the temperature is below the respective threshold value and the pressure is above the respective threshold value.

The pressure-thermostat 1 includes preferably substantially cylindrical transmission means 34, operably interposed between the elastic membrane 9 and the thermostat 12, and especially the bottom 15 of the thermostat, for transmitting the movement from the elastic membrane to the thermostat and vice versa. The means 34 allow, for example, to move the thermostat between the first and the second positions under the action of the elastic membrane. Furthermore, transmission means 34 are suitable for exchanging heat between the thermostat 12 and the membrane 9, for example they are made of a metallic material, so as to create a thermal bridge between the bottom 15 of the thermostat and the membrane 9.

Preferably, said transmission means 34 show a first heat exchange surface 34*a* corresponding with the surface of the transmission means directly contacting the elastic membrane 9. Transmission means 34 are preferably in a single piece but they can also consist of multiple parts.

Advantageously, transmission means 34 show a minimum cross section greater than 8 $mm^2$, wherein the term "minimum cross section" is the cross section having a minimum surface extension among all cross sections of the transmission means 34 taken along the all longitudinal extension of transmission means 34 (namely from the contact surface 34*a* with the membrane 9 until the bottom 15 of the thermostat 12). Preferably, the minimum cross section is greater than 12 $mm^2$, still more preferably it is greater or equal to about 20 $mm^2$, such that the effectiveness (response rate and/or sensitivity) of the thermal bridge between membrane and bottom 15 of the thermostat (in correspondence with the seat of the bimetallic disk) is correspondingly higher. In an optimal solution, the Applicant has determined that the minimum cross section is greater than 50 $mm^2$. In case the transmission means 34 are cylindrical, the minimum cross section advantageously has a diameter higher than 3 mm, preferably higher or equal to 4 mm, still more preferably higher or equal to 5 mm.

Typically, the maximum cross section is lower or equal to the half (preferably to a quarter) of the section of the seat 5 in correspondence with the location point of the maximum cross section itself, wherein the term "maximum cross section" is the cross section having a maximum surface extension among all the cross sections of the transmission means 34 taken along the whole longitudinal extension of the transmission means 34.

With particular reference to the preferred embodiment represented in FIGS. 1 and 2, transmission means 34 are advantageously in a single piece and integrally joined with the bottom 15 of the thermostat 12, such that to avoid any separation and contact surfaces between bottom 15 and transmission means 34, and thus further improving the thermal bridge between the housing seat of the bimetallic disk in the bottom 15 and the membrane 9. Preferably, transmission means 34 include a cylinder 34*b* which preferably extends through a central opening of the contrast ring 10 in order to end with the first heat exchange surface above mentioned 34*a* abutting against the elastic membrane 9, in particular arresting against a central portion of this latter. In use, the central portion becomes deformed due to the pressure within the fluid above the threshold value.

Advantageously, as shown in FIGS. 1 and 2, the minimum cross section of the transmission means 34 is not lower than the first heat exchange surface 34*a*, so as to allow the introduction of transmission means 34 in the contrast ring 10 when the contrast ring 10 is already mounted within the body 3, unlike the transmission means 34 shown in FIG. 3, wherein it is necessary to introduce the transmission means 34 first, and then the ring 10.

FIG. 3 shows a second embodiment of the present invention, for which the elements identical, because of function and/or structure, to the elements already existing in the first embodiment of FIGS. 1 and 2 will not be further described. In FIG. 3 (as in FIGS. 4 and 5) and in the following, where appropriate, the same numerals introduced previously and in FIGS. 1 and 2 are used.

The solution shown in FIG. 3 is substantially different from the one shown in FIG. 1 due to the different conformation of the transmission means 34. The transmission means 34 are a separated element from the bottom 15 and therefore they show a second heat exchange surface 34*c* in a direct contact with a heat exchange surface 15*a* of the bottom 15 of the thermostat 12. Advantageously, the second heat exchange surface 34*c* of the transmission means 34 is countershaped to the heat exchange surface 15*a* of the bottom 15.

Always referring to FIG. 3, the cylindrical body 34*b* shows at least a cylindrical cavity 34*d* suitable for receiving at least a corresponding cylindrical protrusion 15*b* of the bottom 15 of the thermostat 12. In this way, the second heat exchange surface 34*c* of the transmission means 34 and the countershaped heat exchange surface 15*a* of the bottom 15 show a surface extension more extensive than the one that they would show in the absence of the shapings, thus improving the heat coupling between bottom 15 and transmission means 34. It is to be specified that in case of the embodiment shown in FIG. 3, and where appropriate by analogy, for the purposes of the determination of the minimum cross section, as above defined, it is also to be considered the cylindrical protrusion 15*b* of the bottom 15 itself, which in this point of view is part of the transmission means 34.

It is understood that the present invention also foresees the case in which the second heat exchange surface 34*c* and the heat exchange surface 15*a* are free of particular shapings, for example they are plane, wherein according to the present invention, the second heat exchange surface 34*c* is greater than 8 $mm^2$, preferably greater than 12 $mm^2$, still more preferably greater or equal to 20 $mm^2$, and in an optimal embodiment, greater or equal to 50 $mm^2$.

Always referring to FIG. 3, transmission means 34 optionally include a flange 34*e* which transversally protrudes from the remaining body of the transmission means 34, such that, in use, under the thrust of the membrane 9, it contrasts against a recess of the contrast ring 10, by determining an end stop of the membrane-transmission means-thermostat assembly.

Figure 4:
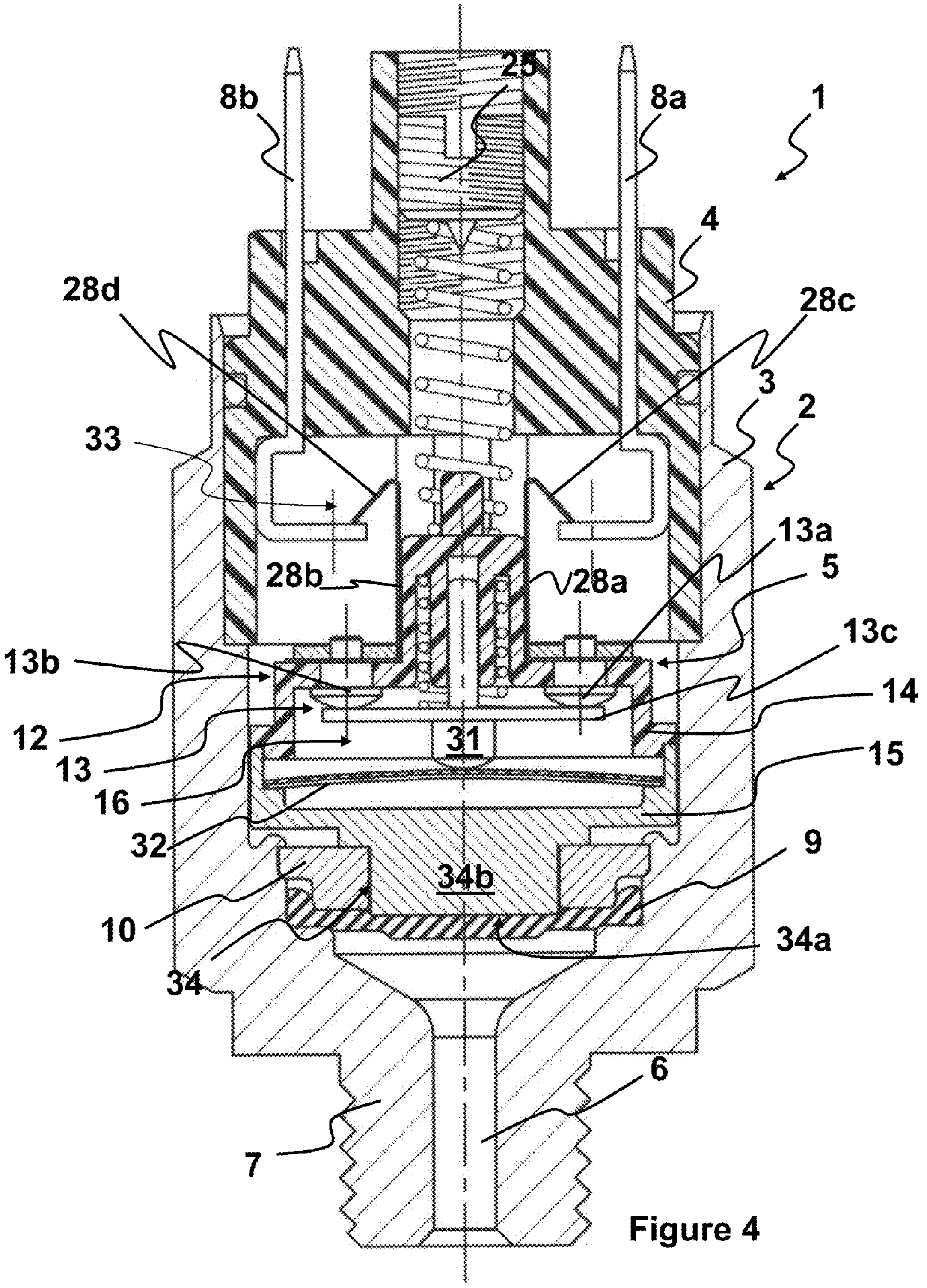
FIG. 4 is a sectional representation of a pressure-thermostat according to a first variation of the first embodiment solution of the present invention.

FIG. 4 shows a first variant of the first embodiment solution of FIG. 1, for which elements identical, because of function and/or structure, to the elements already described, will not be further described. The solution shown in FIG. 4 is different from the one shown in FIG. 1 substantially for the different conformation of the electric switch 33.

With reference to the second electric switch 33, the conductive foils 28*a*, 28*b* connected with the fixed conductors 13*a*, 13*b*, respectively, are extending parallel (for example adjacently) to the cylindrical portion 22 of the support element 14 of the thermostat 12 for finishing with a hook end 28*c*, 28*d* which engages the corresponding electric conductor 8*a*, 8*b* from the opposite part with respect to the thermostat 12.

When, in use, the fluid pressure exceeds a predetermined threshold value, the elastic membrane 9 bents itself by pushing the thermostat 12 against the electric conductors 8*a*, 8*b*.

The thermostat 12 moves within the housing cavity 5 and the conductive foils 28*a*, 28*b* disengage the corresponding electric conductors 8*a*, 8*b* by loosing the electric contact with the same and opening the second switch 33.

Supposing that the laminar element 32 is arranged such that, at a temperature below the predetermined threshold value, it lays in a first hollow conformation with a cavity towards the first electric switch 13 (not shown), such that the first electric switch 13 is in an opened condition, namely with the movable conductor 13*c* lowered, when the laminar element 32 is heated above the predetermined threshold value, it takes a second hollow (or plane) conformation (shown in FIG. 4). Such form change determines the raising of the movable conductor 13*c* which therefore closes the first switch 13. Being the first and second switches 13, 33 arranged in series, in use the two contacts 8*a* and 8*b* remain open in all the situations in which the temperature is below the respective threshold value or the pressure is above the respective threshold value, while the two contacts are connected only when both the temperature is above the respective threshold value and the pressure is below the respective threshold value.

It is noted, on this matter, that by overturning the bimetallic disk 32 (such that the conformation shown in FIG. 4 becomes in this case the one in correspondence with temperature values below the threshold value) the first switch 13 remains close for temperature values below the threshold value and vice versa. In this case, in use, the two contacts 8*a* and 8*b* remain open in all situations in which at least one among the temperature and the pressure of the fluid in the conduit 6 is above the respective threshold value, whereas the two contacts are connected only when both the temperature and the pressure are below the respective threshold.

Figure 5:
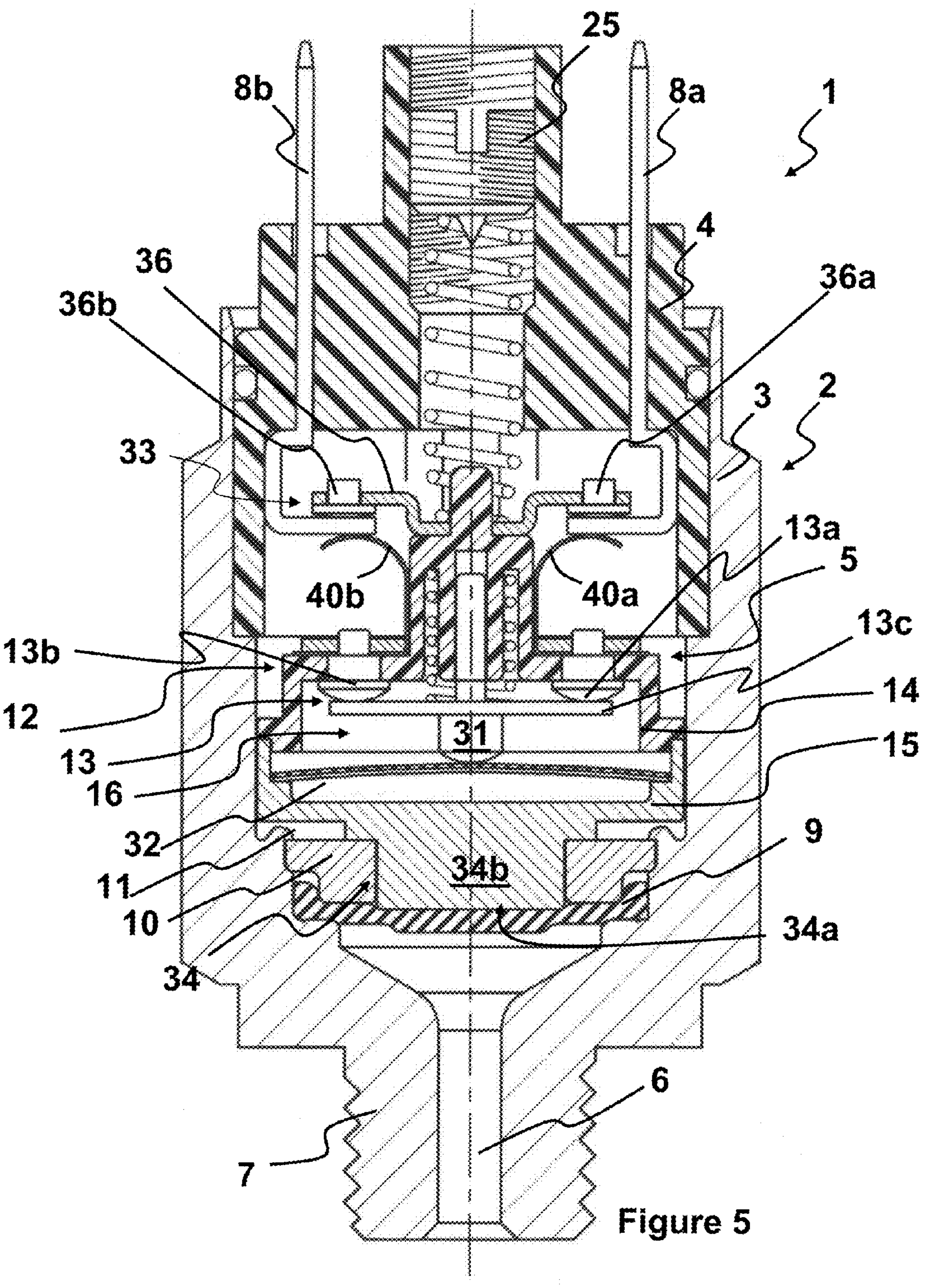
FIG. 5 is a sectional representation of a pressure-thermostat according to a second variation of the first embodiment solution of the present invention.

FIG. 5 shows a second variation of the first embodiment solution of FIG. 1, for which the elements identical, because of function and/or structure, to the elements already described, will not be further described. The solution shown in FIG. 5 is different from the one shown in FIGS. 1 and 4 substantially due to a different electric connection between the first and the second switches, such that these latter are arranged in parallel, whereby only the opening of both switches determines the fed off of the electric conductors 8*a*, 8*b*.

More particularly, as visible in FIG. 5, the second electric switch 33 shows a movable electric bridge 36 operably interposed between the electric conductors 8*a*, 8*b*. In particular, the electric bridge 36 is engaged above the cylindrical portion 22 of the support element 14 of the thermostat 12. It shows, from opposite parts, two contact ends 36*a*, 36*b*, suitable for contacting the electric conductors 8*a*, 8*b*. For the purpose of carrying out a bridging connection of the electric switches 13, 33, the pressure-thermostat 1 further includes two flexible conductive foils 40*a*, 40*b* shaped for keeping a permanent electric connection between the fixed conductors 13*a*, 13 from one side and the respective electric conductors 8*a*, 8*b*, from the other side, respectively.

According to such a configuration, by assuming that the laminar element 32 is arranged such that, at a temperature above the threshold value, it shows a convexity (shown in FIG. 5) faced towards the first electric switch 13, so that the first electric switch 13 is in a close condition, in use, the two contacts 8*a* and 8*b* remain close in all the situations in which the temperature is above the respective threshold value or the pressure is below the respective threshold value, while the two contacts are fed off only when both the temperature is below the threshold value and the pressure is above the respective threshold value.

It is observed, on this matter, that by overturning the bimetallic disk 32 (such that the conformation shown in FIG. 5 becomes, in this case, the one in correspondence with temperature values below the threshold value), in use the two contacts 8*a* and 8*b* remain close in all the situations in which at least one between the temperature and the pressure of the fluid in the conduit 6 is below the respective threshold value, while the two contacts are fed off only when both the temperature and the pressure are above the respective threshold.

It is understood that the pressure-thermostat of the present invention also foresees the case (not shown but obtainable by the combination of the embodiments of FIG. 5 and FIG. 1) wherein the first and second switches are arranged in parallel, the first switch being shaped such that it remains open for pressure values below the threshold and open for values above the threshold.

It is understood that the first and second embodiment variations shown in FIGS. 4 and 5 can be equally applied to the second embodiment solution of the present invention shown in FIG. 2. It is understood that the pressure-thermostat of the present invention also foresees the case (not shown) in which the first and the second switches are not electrically connected therebetween, such that they are able to separately detect the pressure and temperature states. In this case, the pressure-thermostat includes a first couple of contacts (for example the couple 8*a* and 8*b* shown in the figures) only connected with the second switch 33 and an additional couple of contacts only connected with the first switch 13.

The invention attains important advantages and reaches the proposed aims.

First of all, it is to be noted that the pressure-thermostat according to the present invention is capable of responding with an improved rapidity and sensitivity to temperature variations within the fluid, whereby when the temperature reaches a predetermine threshold value, the thermostat immediately springs up by activating the first switch 13 without delays or with a reduced delay. In other words, the temperature variations of the fluid are directly or rapidly transmitted to the bottom 15 of the thermostat 12 and accordingly to the laminar element 32. The heat exchange between the bottom 15 of the thermostat 12 and the elastic membrane 9 contacting the fluid is facilitated by wide heat exchange surfaces 34*a*, 34*c* interposed between such elements and by wide surfaces of the sections of the transmission means 34.

What is claimed is:

1. A pressure-thermostat (1) including:

a body (2) having a housing cavity (5) and a conduit (6) suitable for containing a fluid;

an elastic membrane (9) arranged for separating in a fluid-tight manner said conduit (6) from said housing cavity (5), said elastic membrane (9) being elastically deformable between a resting condition and a working condition, wherein at least a portion thereof is protruded towards said housing cavity (5);

a thermostat (12) including a bottom (15), said thermostat (12) being movable within said housing cavity (5) between a first position and a second position; and transmission means (34) interposed between said elastic membrane (9) and said thermostat (12) for transmitting the movement from the elastic membrane (9) to the thermostat (12) and vice versa, such that the first and the second positions of the thermostat correspond with the resting condition and the working condition, respectively, of said elastic membrane (9), said transmission means (34) being suitable for carrying out a thermal bridge between said elastic membrane (9) and said thermostat (12), wherein said transmission means (34) have a minimum cross section greater than 8 $mm^2$.

2. A pressure-thermostat according to claim 1, wherein said transmission means (34) are a single piece with said bottom (15) of said thermostat (12).

3. A pressure-thermostat according to claim 2, wherein said minimum cross section is greater than 20 $mm^2$.

4. A pressure-thermostat according to claim 2, wherein the thermostat (12) includes a thermally deformable element (32) housed in proximity of said bottom.

5. A pressure-thermostat according to claim 1, wherein said transmission means (34) have at least a hollow (34*d*) suitable for receiving at least a corresponding protrusion (15*b*) of the bottom (15) of the thermostat (12) countershaped to said hollow.

6. A pressure-thermostat according to claim 5, wherein said minimum cross section is greater than 20 $mm^2$.

7. A pressure-thermostat according to claim 5, wherein the thermostat (12) includes a thermally deformable element (32) housed in proximity of said bottom.

8. A pressure-thermostat according to claim 1, wherein said minimum cross section is greater than 20 $mm^2$.

9. A pressure-thermostat according to claim 8, wherein said minimum cross section of the transmission means (34) is not smaller than a first heat exchange surface (34*a*) corresponding with the surface of the transmission means directly contacting with said elastic membrane (9).

10. A pressure-thermostat according to claim 8, wherein the thermostat (12) includes a thermally deformable element (32) housed in proximity of said bottom.

11. A pressure-thermostat according to claim 10, wherein said thermostat (12) includes a first electric switch (13) activable owing to a thermal deformation of said thermally deformable element (32).

12. A pressure-thermostat according to claim 11, wherein said body (2) further includes a second electric switch (33) activable owing to a transition of said thermostat (12) from said first to said second position and vice versa.

13. A pressure-thermostat according to claim 1, wherein said minimum cross section of the transmission means (34) is not smaller than a first heat exchange surface (34*a*) corresponding with the surface of the transmission means directly contacting with said elastic membrane (9).

14. A pressure-thermostat according to claim 1, wherein the thermostat (12) includes a thermally deformable element (32) housed in proximity of said bottom.

15. A pressure-thermostat according to claim 14, wherein said thermally deformable element (32) is a disk having a diameter greater than or equal to 15 mm.

16. A pressure-thermostat according to claim 14, wherein said thermostat (12) includes a first electric switch (13) activable owing to a thermal deformation of said thermally deformable element (32).

17. A pressure-thermostat according to claim 16, wherein said body (2) further includes a second electric switch (33) activable owing to a transition of said thermostat (12) from said first to said second position and vice versa.

18. A pressure-thermostat according to claim 17, wherein said first and second switches are electrically connected in series or in parallel.

19. A pressure-thermostat according to claim 1, wherein said housing cavity (5) has a circular section with a diameter smaller than or equal to 22 mm.

20. A pressure-thermostat according to claim 1, wherein said body (2) further includes a second electric switch (33) activable owing to a transition of said thermostat (12) from said first to said second position and vice versa.

* * * * *